US011802951B2

(12) United States Patent
Cho et al.

(10) Patent No.: US 11,802,951 B2
(45) Date of Patent: Oct. 31, 2023

(54) ELECTRONIC DEVICE AND ELECTRONIC DEVICE CONTROL METHOD

(71) Applicant: Samsung Electronics Co., Ltd., Gyeonggi-do (KR)

(72) Inventors: Walyong Cho, Gyeonggi-do (KR); Kyungmin Park, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 9 days.

(21) Appl. No.: 17/296,761

(22) PCT Filed: Nov. 26, 2019

(86) PCT No.: PCT/KR2019/016363
§ 371 (c)(1),
(2) Date: May 25, 2021

(87) PCT Pub. No.: WO2020/111727
PCT Pub. Date: Jun. 4, 2020

(65) Prior Publication Data
US 2022/0026549 A1  Jan. 27, 2022

(30) Foreign Application Priority Data
Nov. 30, 2018  (KR) ........................ 10-2018-0152882

(51) Int. Cl.
*G01S 5/18*  (2006.01)
*G01S 11/14*  (2006.01)
*H04L 12/28*  (2006.01)

(52) U.S. Cl.
CPC ................. *G01S 11/14* (2013.01); *G01S 5/18* (2013.01); *H04L 12/2803* (2013.01); *H04L 2012/2841* (2013.01); *H04L 2012/2849* (2013.01)

(58) Field of Classification Search
CPC ........ G01S 11/14; G01S 5/18; H04L 12/2803; H04L 2012/2841; H04L 2012/2849; H04L 12/2809
See application file for complete search history.

(56) References Cited

U.S. PATENT DOCUMENTS 9,042,906 B1   5/2015   Sushkov et al.
9,560,440 B2   1/2017   Wang et al.
(Continued)

FOREIGN PATENT DOCUMENTS

EP         3439144 B1 *  11/2020  ............. G01S 13/42
KR      1020130099139       9/2013
(Continued)

OTHER PUBLICATIONS

PCT/ISA/210 Search Report issued on PCT/KR2019/016363, dated Mar. 17, 2020, pp. 5.
(Continued)

*Primary Examiner* — Yuqing Xiao
*Assistant Examiner* — Christopher Richard Walker
(74) *Attorney, Agent, or Firm* — The Farrell Law Firm, P.C.

(57) ABSTRACT

Disclosed is an electronic device that includes a display, a communication module, at least one microphone, at least one speaker, a processor operatively coupled to the display, the communication module, the microphone, and the speaker, and a memory operatively coupled to the processor. The memory may store instructions, when executed, causing the processor to transmit, through the speaker, a first audio sound including first information, receive, through the microphone, a second audio sound including second information responding to the first information from a first external electronic device, transmit, through the speaker, a third audio sound including third information for acquiring
(Continued)

a distance to the first external electronic device after receiving the second audio sound, and receive, through the microphone, a fourth audio sound including fourth information responding to the third information from the first external electronic device.

18 Claims, 12 Drawing Sheets

(56) References Cited

U.S. PATENT DOCUMENTS

| | | | |
|---|---|---|---|
| 9,769,564 B2 | 9/2017 | Goran et al. | |
| 2014/0181683 A1* | 6/2014 | Lim | H04L 63/108 |
| | | | 715/740 |
| 2015/0029880 A1 | 1/2015 | Burns et al. | |
| 2015/0176988 A1* | 6/2015 | Cho | H04M 1/72412 |
| | | | 702/158 |
| 2015/0219755 A1* | 8/2015 | Borggaard | G01S 11/14 |
| | | | 367/118 |
| 2016/0291141 A1 | 10/2016 | Han et al. | |
| 2017/0030999 A1* | 2/2017 | Garner | G01S 3/801 |
| 2017/0048797 A1* | 2/2017 | Choi | H04W 4/027 |
| 2017/0131402 A1 | 5/2017 | Orlik et al. | |
| 2017/0289149 A1 | 10/2017 | Daley et al. | |
| 2018/0084517 A1 | 3/2018 | Do et al. | |
| 2018/0128896 A1* | 5/2018 | Kim | G01S 19/05 |
| 2018/0239008 A1* | 8/2018 | Han | G01S 13/82 |
| 2019/0204408 A1* | 7/2019 | Booij | G01S 5/18 |

FOREIGN PATENT DOCUMENTS

| | | |
|---|---|---|
| KR | 1020150125232 | 11/2015 |
| KR | 1020160036496 | 4/2016 |
| KR | 10-2016-0118923 | 10/2016 |
| KR | 10-2018-0011560 | 2/2018 |
| KR | 10-2018-0124435 | 11/2018 |

OTHER PUBLICATIONS

PCT/ISA/237 Written Opinion issued on PCT/KR2019/016363, dated Mar. 17, 2020, pp. 5.
Peng, Chunyi et al., "BeepBeep: A High Accuracy Acoustic Ranging System using COTS Mobile Devices", SenSys 2007, pp. 14.
Korean Office Action dated Jun. 22, 2023 issued in counterpart application No. 10-2018-0152882, 20 pages.

* cited by examiner

ELECTRONIC DEVICE AND ELECTRONIC DEVICE CONTROL METHOD

PRIORITY

This application is a National Phase Entry of International Application No. PCT/KR2019/016363, which was filed on Nov. 26, 2019, and claims priority to Korean Patent Application No. 10-2018-0152882, filed in the Korean Intellectual Property Office on Nov. 30, 2018, the entire content of each of which is incorporated herein by reference.

BACKGROUND

1. Field

Various embodiments of the disclosure relate to an electronic device which measures a distance by using an inaudible audio sound and transmits/receives location information.

2. Related Art

Recently, a technology for establishing communication among a plurality of electronic devices and transmitting/receiving information of the electronic devices has been widely used. Accordingly, a user may control other electronic devices by using one electronic device. Alternatively, a user may identify data collected by other electronic devices through an electronic device without having to perform a special manipulation.

For example, a user who uses a smartphone at home may connect to a cloud server to identify an operation status or location information of an external electronic device such as a refrigerator, a Television (TV) set, or an air purifier, and may instruct a necessary operation.

In a situation where a plurality of electronic devices are used at home, a user may input locations of the plurality of electronic devices to utilize functions based on the locations. In this case, when an electronic device is newly installed or the electronic device is moved, the user may inconveniently have to manually input a location every time.

SUMMARY

An electronic device according to an embodiment may include a display, a communication module, at least one microphone, at least one speaker, a processor operatively coupled to the display, the communication module, the microphone, and the speaker, and a memory operatively coupled to the processor. The memory may store instructions, when executed, causing the processor to transmit, through the speaker, a first audio sound including first information, receive, through the microphone, a second audio sound including second information responding to the first information from a first external electronic device, transmit, through the speaker, a third audio sound including third information for acquiring a distance to the first external electronic device after receiving the second audio sound, receive, through the microphone, a fourth audio sound including fourth information responding to the third information from the first external electronic device, acquire the distance to the first external electronic device on the basis of the third information and/or the fourth information, transmit, through the speaker, a fifth audio sound including fifth information to the first external electronic device, if the acquired distance is within a predetermined distance, receive, through the microphone, a sixth audio sound including sixth information responding to the fifth information, and register a location of the electronic device on the basis of the sixth information.

A method of controlling an electronic device according to an embodiment may include transmitting a first audio sound including first information through a speaker, receiving a second audio sound including second information responding to the first information from a first external electronic device through a microphone, and transmitting a third audio sound including third information for identifying a distance to the first external electronic device through the speaker, receiving a fourth audio sound including fourth information responding to the third information from the first external electronic device through the microphone, and acquire the distance to the first external electronic device on the basis of the third information and/or the fourth information, transmitting a fifth audio sound including fifth information to the first external electronic device through the speaker, if the acquired distance is within a predetermined distance, and receiving a sixth audio sound including sixth information responding to the fifth information through the microphone, and registering a location of the electronic device on the basis of the sixth information.

According to an embodiment of the disclosure, location information of an electronic device can be received from an external electronic device to easily register a location of the electronic device.

According to an embodiment of the disclosure, when a pre-set condition is satisfied, location information of an electronic device can be received from an external electronic device.

According to an embodiment of the disclosure, an electronic device can receive a location from an external electronic device to register the location of the external electronic device.

DETAILED DESCRIPTION

Figure 1A:
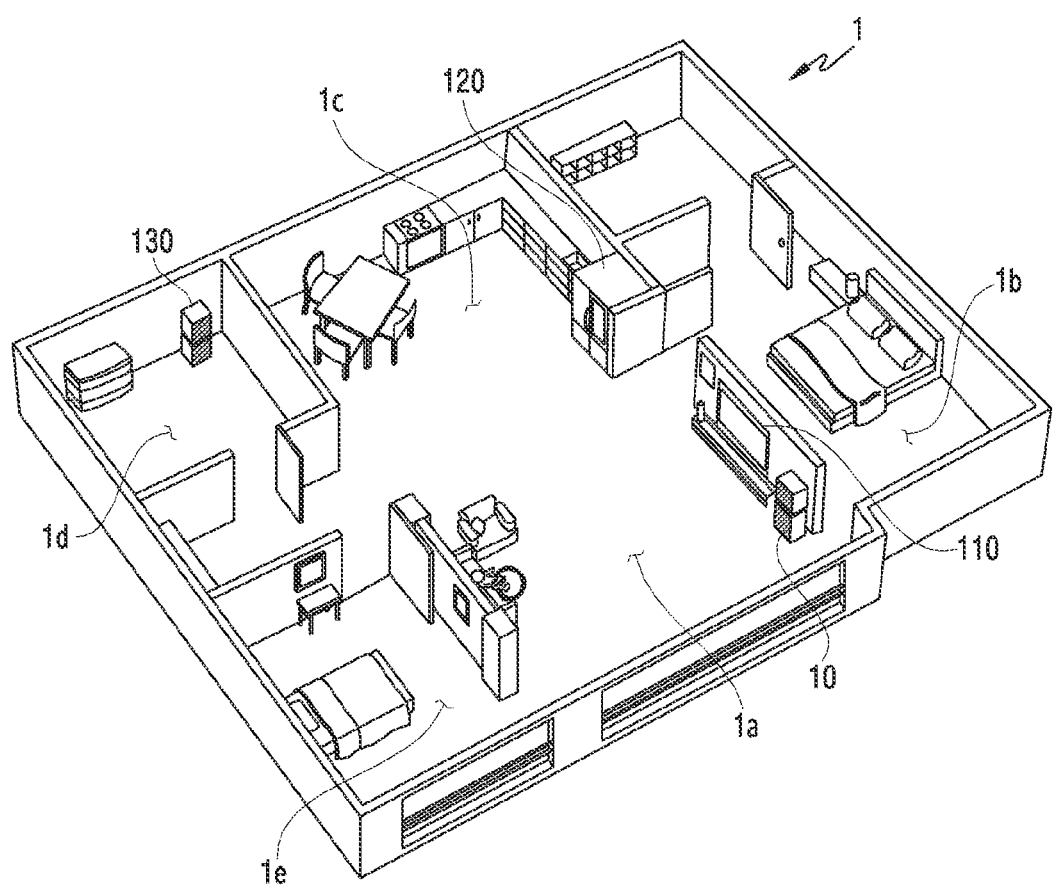
FIG. 1A to 1C illustrate a situation of registering a location of an electronic device according to an embodiment.

Hereinafter, various embodiments of the disclosure are described with reference to the accompanying drawings.

However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements.

An expression "have", "may have", "include" or "may include" or the like used in the disclosure is intended to indicate a presence of a corresponding characteristic (e.g., a number, a function, an operation, or a component such as a component), and should be understood that there are additional possibilities of one or more other characteristics.

In the disclosure, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the disclosure to express various components, it is not intended to limit the corresponding components. The above expressions may be used to distinguish one component from another component. For example, a $1^{st}$ user device and a $2^{nd}$ user device are both user devices, and indicate different user devices. For example, a $1^{st}$ component may be termed a $2^{nd}$ component, and similarly, the $2^{nd}$ component may be termed the $1^{st}$ component without departing from the scope of the disclosure.

When a certain component (e.g., the $1^{st}$ component) is mentioned as being "operatively or communicatively coupled with/to" or "connected to" a different component (e.g., the $2^{nd}$ component), it is to be understood that the certain component s directly coupled with/to another component or can be coupled with/to the different component via another component (e.g., a $3^{rd}$ component). On the other hand, when the certain component (e.g., the $1^{st}$ component) is mentioned as being "directly coupled with/to" or "directly connected to" the different component (e.g., the $2^{nd}$ component), it may be understood that another component (e.g., the $3^{rd}$ component) is not present between the certain component and the different component.

An expression "configured to" used in the disclosure may be interchangeably used with, for example, "suitable for", "having the capacity to". "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly, understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

An electronic device according to various embodiments of the disclosure may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG-1 Audio Layer 3 (MP3) player, a mobile medical device, a camera, and a wearable device. According to various embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit)

Hereinafter, an electronic device according to various embodiments are described with reference to the accompanying drawings. The term 'user' used in the disclosure may refer to a person who uses the electronic device or a device (e.g., an Artificial Intelligence (AI) electronic device) which uses the electronic device.

Figure 1B:
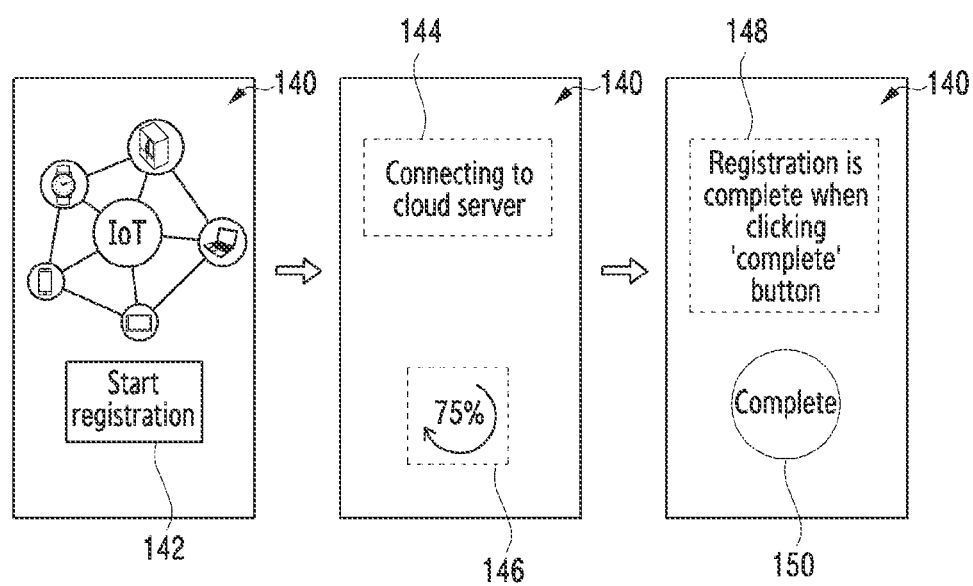
Figure 1C:
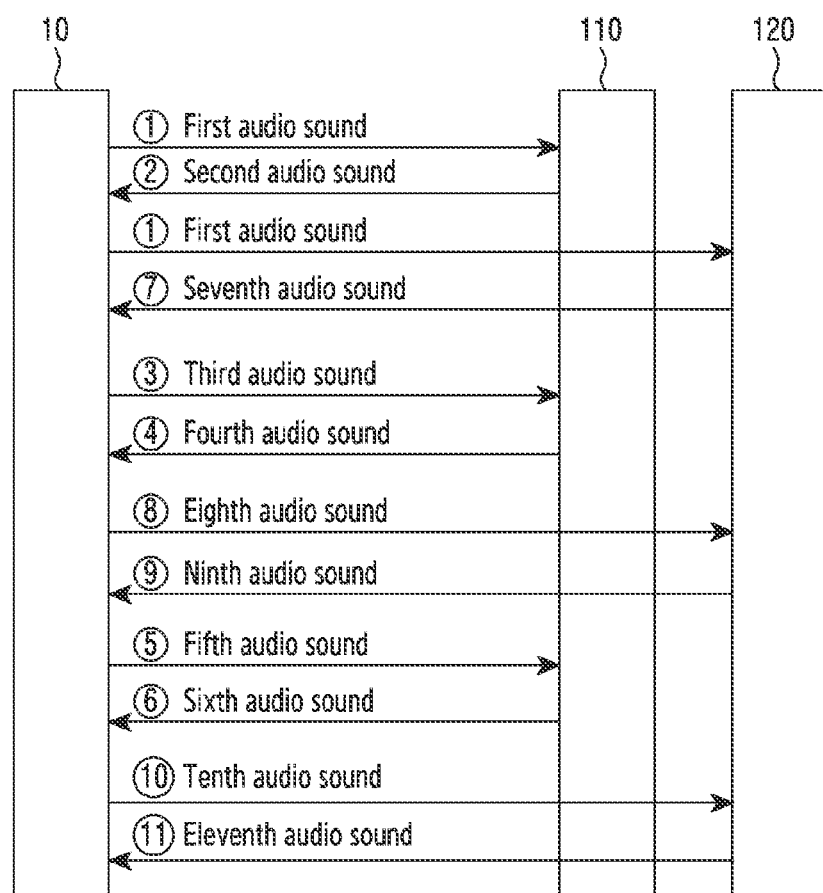

FIG. 1A to FIG. 1C illustrate a situation of registering a location of an electronic device according to an embodiment.

Referring to FIG. 1A, a space 1 in which an electronic device 10 is located may be divided into a plurality of regions (e.g., a living room 1a, a master room 1b, a kitchen 1c, a first sub-room 1d, and a second sub-room 1e). In addition to the electronic device 10, a plurality of electronic devices (e.g., a first external electronic device 110, a second external electronic device 120, and a third external electronic device 130) may be located in the space 1.

According to an embodiment, the plurality of electronic devices 10, 110, 120, and 130 may be in a state in which communication is established for one another in the space 1. For example, the plurality of electronic devices 10, 110, 120, and 130 may use a first network (e.g., a short-range communication network such as Bluetooth, WiFi direct, or Infrared Data Association (IrDA)) to transmit/receive information among the electronic devices 10, 110, 120, and 130.

According to various embodiments, the plurality of electronic devices 10, 110, 120, and 130 may use a second network (e.g., a cellular network, the Internet, or a computer network (e.g., or WAN)) to connect to a cloud server, thereby transmitting/receiving information among the electronic devices 10, 110, 120, and 130. In this case, the cloud server may collect, store, and manage information of each of the electronic devices 10, 110, 120, and 130. Alternatively, the cloud server may generate and transmit a command for controlling each of the electronic devices 10, 110, 120, and 130, based on a user's control. It is assumed hereinafter that the plurality of electronic devices 10, 110, 120, and 130 are connected to the cloud server to transmit/receive information.

FIG. 1B illustrates a process in which the electronic device 10 is registered to a cloud server to which the plurality of electronic devices 110, 120, are 130 are pre-registered.

Referring to FIG. 1B, the electronic device 10 may execute an IoT application which executes a process of registering the electronic device to the cloud server and thus may display an execution screen 140 of the IoT application.

According to an embodiment, if the electronic device 10 includes a display, the electronic device 10 may display the execution screen 140 of the IoT application on the display. According to various embodiments, if the electronic device 10 does not include the display, the electronic device 10 may use another electronic device including a display to display the execution screen of the IoT application. For example, an electronic device without a display may first establish communication with an external electronic device with a display, and then may perform a process described below by using the external electronic device with the display.

The execution screen 140 of the IoT application may display, for example, a registration start execution object 142 which starts the process of registering the electronic device 10 to the cloud server. The electronic device 10 may perform a cloud server connection operation in response to a user input for selecting the registration start execution object 142.

According to an embodiment, the electronic device 10 may display a notification 144 indicating that an operation of connecting to the cloud server is in progress and an object 146 indicating the progress of the IoT application on the execution screen 140 of the IoT application.

For example, while displaying the notification 144 and the object 146 indicating the progress on the execution screen 140 of the IoT application, the electronic device 10 may establish communication with the cloud server to transmit information of the electronic device 10 (e.g., a name (or ID information) of the electronic device, battery information, or information on main functions) to the cloud server. In addition, the electronic device 10 may receive, for example, information on other electronic devices pre-registered to a cloud.

According to an embodiment, the electronic device 10 may display a notification 148 indicating that a connection operation is complete with respect to the cloud server and a completion object 150 requesting for a user's confirmation on the execution screen 140 of the IoT application.

The electronic device 10 may end the connection operation with respect to the cloud server in response to a user's input for selecting the completion object 150 requesting for the user's confirmation.

According to an embodiment, the plurality of electronic devices 10, 110, 120, and 130 may establish one network to provide the user with a service (or a function). For example, the user may instruct an artificial intelligence speaker (not shown) connected to the cloud server to "Run the air purifier (e.g., the third external electronic device 130) in the first small room 1*d*.". In this case, the artificial intelligence speaker may transmit a signal for running the air purifier of the first small room 1*d*, connected through the cloud server. To this end, the plurality of electronic devices 10, 110, 120, and 130 need to register respective locations thereof in the space 1.

Referring to FIG. 1C, the electronic device 10 may use an audio sound to communicate with the first external electronic device 110 and the second external electronic device 120. For example, the electronic device 10 and the external electronic devices 110 and 120 may use the audio sound to measure a distance to each other. Alternatively, the electronic device 10 and the external electronic devices 110 and 120 may mutually transmit/receive the audio sound by including data therein. The audio sound may be, for example, an inaudible audio sound which cannot be heard by human hearing. To this end, the electronic device 10, the first external electronic device 110, and the second external electronic device 120 may include at least one speaker capable of outputting the audio sound and at least one microphone capable of receiving the audio sound.

According to an embodiment, in operation ①, the electronic device 10 may control the speaker to transmit a first audio sound including first information. The first information may include, for example, a message (e.g., Hello) reporting a presence of the electronic device 10.

According to various embodiments, the electronic device 10 may identify whether location information of the electronic device is pre-stored before transmitting the first audio sound. For example, the electronic device 10 may identify whether the location information of the electronic device is pre-stored when the electronic device 10 is booted, when a movement of the electronic device 10 is detected, when a set period has been reached, or when there is a user's request. If an identification result shows that the location information is not pre-stored, the electronic device 10 may transmit the first audio sound to perform the following process of registering a location. In addition, if the identification result shows that the location information is pre-stored, the electronic device 10 may not transmit the first audio sound.

For example, the electronic device 10 may modulate information and transmit an audio sound including the information. A modulation scheme may use, for example, Amplitude Shift Keying (ASL), Frequency Shift Keying (FSK), and Phase Shift Keying (PSK).

According to various embodiments, the electronic device 10 may use a technology of "Beepbeep: A High Accuracy Acoustic Ranging System using COTS Mobile Devices" published in a paper to perform communication using the external electronic devices 110 and 120 and the audio sound.

According to an embodiment, in operation ②, the electronic device 10 may control the microphone to receive from the first external electronic device 110 a second audio sound including second information responding to the first information. The first external electronic device 110 may be an electronic device which has already been located in the space 1 in which the electronic device 10 is located. The first external electronic device 110 may be in a state in which, for example, information on a place where it is located is stored. The second information included in the second audio sound received from the first external electronic device 110 may include a unique identification number (or an IDentification (ID)) of the first external electronic device 110.

According to an embodiment, in operation ③, after receiving the second audio signal, the electronic device 10 may transmit a third audio sound including third information for identifying a distance to the first external electronic device 110 through the speaker. The third information may include, for example, time information.

According to an embodiment, in operation ④, the electronic device 10 may receive from the first external electronic device 110 a fourth audio sound including fourth information responding to the third information through the microphone. The fourth information may include, for example, time information.

According to an embodiment, the electronic device 10 may acquire the distance to the first external electronic device 110 on the basis of the third information and/or the fourth information.

For example, the electronic device 10 may measure a delay time. The delay time may include, for example, a signal processing time required until the electronic device 10 transmits the third audio sound by using the speaker. The delay time may include, for example, a signal processing time required until the electronic device 10 receives the fourth audio sound by using the microphone. The delay time may include a time synchronization error between the speaker and the microphone.

For example, the electronic device 10 may execute a command for transmitting the third audio sound, and may measure a delay time required until the speaker receives a signal from a sound card or a digital analog converter to transmit the third audio sound and a delay time required until the fourth audio signal is received through the sound card or the digital analog converter.

According to an embodiment; the electronic device 10 may acquire a phase value. The electronic device 10 may acquire a phase value of at least one frequency corresponding to the received fourth audio sound. For example, the electronic device 10 may generate a sine function matrix and cosine function matrix corresponding to the received fourth audio sound, and may divide a coefficient corresponding to the cosine function matrix by a coefficient corresponding to the sine function matrix to acquire the phase value of at least one frequency corresponding to the fourth audio sound.

According to various embodiments, the electronic device 10 may include a plurality of speakers and a plurality of microphones. In this case, the electronic device 10 may acquire a phase value of a frequency corresponding to an audio sound transmitted from one speaker, acquire a phase value of a frequency corresponding to an audio sound transmitted from another speaker, and acquire a difference value of the phase values. In this case, the electronic device 10 may acquire a phase value corresponding to the acquired difference value.

According to an embodiment, the electronic device 10 may acquire the distance to the first external electronic device 110. The electronic device 10 may acquire the distance on the basis of the acquired phase value.

For example, after the third audio sound is transmitted through the acquired phase value and the speaker, the electronic device 10 may acquire the distance to the first external electronic device 110 on the basis of the number of vibrations of the third audio sound and fourth audio sound, in a situation where the fourth audio sound is received through the microphone.

According to an embodiment, in operation ⑤, if the acquired distance is within a predetermined distance, the electronic device 10 may transmit a fifth audio sound including fifth information to the first external electronic device 110 through the speaker. The fifth information may include, for example, content inquiring location information of the first external electronic device 110.

According to various embodiments, the predetermined distance may be determined based on strength of the first audio sound transmitted by the electronic device 10. For example, if the strength of the first audio sound is strong, the predetermined distance may increase, whereas if the strength of the first audio signal is weak, the predetermined distance may decrease.

According to an embodiment, in operation ⑥, the electronic device 10 may receive a sixth audio sound including sixth information responding to the fifth information through the microphone. The sixth information may include, for example, content for location information of the first external electronic device 110.

According to an embodiment, the electronic device 10 may register a location of the electronic device 10 on the basis of the sixth information.

Referring to FIG. 1C, the electronic device 10 may transmit/receive an audio sound with respect to the second external electronic device 120 to register the location of the electronic device 10.

According to an embodiment, in operation ①, the electronic device 10 may control the speaker to transmit a first audio sound including first information. The first information may include, for example, a message (e.g., Hello) reporting a presence of the electronic device 10.

According to an embodiment, in operation ⑦, the electronic device 10 may control the microphone to receive from the second external electronic device 120 a seventh audio sound including seventh information responding to the first information. The second external electronic device 120 may be another electronic device which has already been located in the space 1 in which the electronic device 10 is located. The second external electronic device 120 may be in a state in which, for example, information on a place where it is located is stored. The seventh information included in the seventh audio sound received from the second external electronic device 120 may include a unique identification number (or an IDentification (ID)) of the second external electronic device 120.

According to an embodiment, in operation ⑧, after receiving the seventh audio sound, the electronic device 10 may transmit an eighth audio sound including eighth information for identifying a distance to the second external electronic device 120 through the speaker. The eighth information may include, for example, time information.

According to an embodiment, in operation ⑨, the electronic device 10 may receive from the second external electronic device 120 a ninth audio sound including ninth information responding to the eighth information through the microphone. The ninth information may include, for example, time information.

According to an embodiment, the electronic device 10 may acquire the distance to the second external electronic device 120 on the basis of the eighth information and/or the ninth information. For example, the electronic device 10 may acquire the distance to the second external device 120 on the basis of the eighth information and/or the ninth information in the same manner as acquiring the distance to the first external electronic device 110 on the basis of the third information and/or the fourth information.

According to an embodiment, in operation ⑩, if the acquired distance is within a predetermined distance, the electronic device 10 may transmit a tenth audio sound including tenth information to the second external electronic device 120 through the speaker. The tenth information may include, for example, content inquiring location information of the second external electronic device 120.

According to an embodiment, in operation ⑪, the electronic device 10 may receive an eleventh audio sound including eleventh information responding to the tenth information through the microphone. The eleventh information may include, for example, content for the location information of the second external electronic device 120.

According to an embodiment, the electronic device 10 may register the location of the electronic device 10 on the basis of eleventh information.

According to various embodiments, the electronic device 10 may perform an operation (e.g., the operation ①, the operation ②, the operation ③, the operation ④, the operation ⑤, and the operation ⑥) performed in association with the first external electronic device 110 and an operation (e.g., the operation ①, the operation ⑦, the operation ⑧, the operation ⑨, the operation ⑩, and the operation ⑪) performed in association with the second external electronic device 10 simultaneously or in parallel.

According to various embodiments, the electronic device 10 may merge at least some of an audio sound including a message reporting a presence of the electronic device, an audio sound including time information, and an audio sound including content requesting for location information of an external electronic device.

As such, according to an embodiment of the disclosure, the electronic device 10 may receive a recommendation for a location to be registered by using the external electronic devices 110 and 120 pre-registered to the cloud server.

Figure 2:
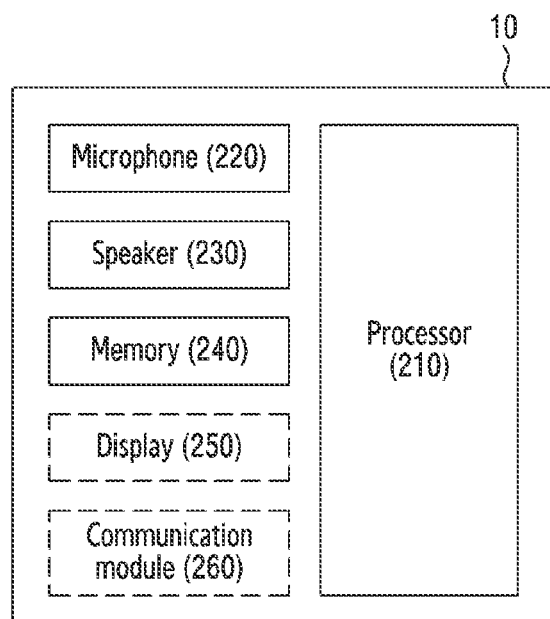
FIG. 2 is a block diagram briefly illustrating an electronic device according to an embodiment.

FIG. 2 is a block diagram briefly illustrating an electronic device according to an embodiment.

Referring to FIG. 2, the electronic device 10 may include a processor 210, a microphone 220, a speaker 230, and a memory 240. However, the disclosure is not limited thereto. The electronic device 10 may further include a plurality of components, or at least one of the components may be excluded. For example, the electronic device 10 may further include a display 250 and/or a wireless communication module 260.

According to an embodiment, the processor 210 may control an overall operation of the electronic device 10. For example, the processor 210 may control the memory 240 to execute a program stored in the memory 240, and may fetch or store necessary information.

According to an embodiment, the processor 210 may transmit, through the speaker 230, a first audio sound including first information, receive, through the microphone 220, a second audio sound including second information responding to the first information from a first external electronic device (e.g., the first external electronic device 110 of FIG. 1A), transmit, through the speaker 230, a third audio sound including third information for acquiring a distance to the first external electronic device 110 after receiving the second audio sound, receive, through the microphone 220, a fourth audio sound including fourth information responding to the third information from the first external electronic device 110, acquire the distance to the first external electronic device 110 on the basis of the third information and/or the fourth information, transmit, through the speaker 230, a fifth audio sound including fifth information to the first external electronic device 110 if the acquired distance is within a predetermined distance, receive, through the microphone 220, a sixth audio sound including sixth information responding to the fifth information, and register a location of the electronic device 10 on the basis of the sixth information.

According to an embodiment, the microphone 220 may acquire a sound (e.g., an audio sound) generated around the electronic device 10 by means of an element which vibrates by a sound wave and coverts a mechanical vibration into an electrical signal. For example, the microphone 220 may receive an audio signal from the first external electronic device 110 and the second external electronic device (e.g., the second external electronic device 120 of FIG. 1A) under the control of the processor 210.

According to an embodiment, the speaker 230 may convert an electronic signal into a vibration of a diaphragm to generate a waveform in the air, and may copy a sound wave. For example, the speaker 230 may transmit the sound wave toward the first external electronic device 110 and the second external electronic device 120 under the control of the processor 210.

According to an embodiment, the memory 240 may include a storage medium of at least one of types including a flash memory type, a hard disk type, a multimedia card micro type, a card-type memory (e.g., an SI) or XI) memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

According to an embodiment, the memory 240 may store instructions configured to transmit, through the speaker 230, a first audio sound including first information, receive, through the microphone 220, a second audio sound including second information responding to the first information from the first external electronic device 110, transmit, through the speaker 230, a third audio sound including third information for acquiring a distance to the first external electronic device 110 after receiving the second audio sound, receive, through the microphone 220, a fourth audio sound including fourth information responding to the third information from the first external electronic device 110, acquire the distance to the first external electronic device 110 on the basis of the third information and/or the fourth information, transmit, through the speaker 230, a fifth audio sound including fifth information to the first external electronic device 110 if the acquired distance is within a predetermined distance, receive, through the microphone 220, a sixth audio sound including sixth information responding to the fifth information, and register a location of the electronic device 10 on the basis of the sixth information.

According to an embodiment, the display 250 may display an image, a video, or an execution screen of an application program. The display 250 may include a touchscreen display for acquiring a touch input. The display 250 may detect, for example, a user's touch input to acquire a sensing value. The processor 210 may use the sensing value acquired by the display 250 to output a feedback.

According to an embodiment, the communication module 260 may couple the electronic device 10 with other electronic devices including the first external electronic device 110 and the second external electronic device 120 under the control of the processor 210. The communication module 260 may include one of components implementing various wired or wireless communication methods, such as wireless LAN, Bluetooth, and wired Ethernet, in association with a performance and structure of the electronic device 10.

Figure 3:
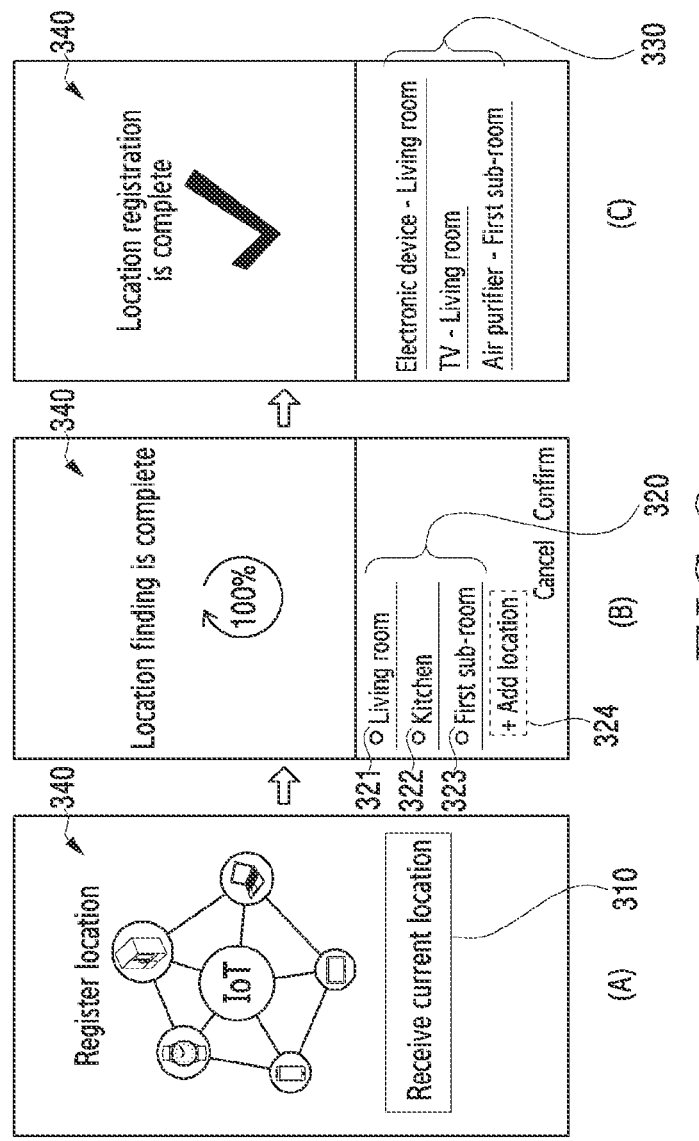
FIG. 3 illustrates a situation in which an electronic device registers a location received from another electronic device according to an embodiment.

FIG. 3 illustrates a situation in which an electronic device registers a location received from another electronic device according to an embodiment.

Referring to (a) of FIG. 3, the electronic device 10 may display an execution screen 340 of an IoT application including a user interface for registering a location of the electronic device 10. The execution screen 340 of the IoT application for executing the location registration may be performed, for example, after a cloud server registration process of the electronic device 10 described with reference to FIG. 1 ends. As described above with reference to FIG. 1, the electronic device 10 may register by receiving location information from external electronic devices (e.g., the first external electronic device HO and the second external electronic device 120) which are pre-registered and located in the vicinity.

According to an embodiment, the electronic device 10 may use an audio sound and an external electronic device located in the vicinity to perform the location registration process, in response to a user input for selecting an execution object 310 for executing a function by which a location is registered.

For example, the electronic device 10 may transmit a first audio sound including information reporting a presence of the electronic device, and may receive from an external electronic device a second audio sound including identification information of the external electronic device in response to the information reporting the presence of the electronic device.

Upon receiving the second audio sound, the electronic device 10 may transmit a third audio sound including time information to acquire a distance to the external electronic device, and may receive from the external electronic device a fourth audio sound including time information in response to the third audio sound including the time information.

The electronic device 10 may use the time information to acquire the distance to the external electronic device, and if the distance is within a predetermined distance, may transmit to the external electronic device a fifth audio sound including a location information inquiry, and may receive from the external electronic device a sixth audio sound including an answer for the location information inquiry.

The electronic device 10 may guide to register the location of the electronic device 10 on the basis of the received location information.

Referring to (b) of FIG. 3, the electronic device 10 may display a location received from the external electronic device on the execution screen 340 of the IoT application. According to an embodiment, the electronic device 10 may display location information received from the external electronic device in proportion to a distance between the external electronic device and the electronic device 10. For example, the electronic device 10 may display a living room 321, which is the location information received from the first external electronic device 110 closest in distance to the electronic device 10, on the top. In addition, the electronic device 10 may display a kitchen 322 and a first sub-room 323 according to the distance to the electronic device 10.

According to an embodiment, if the distance between the external electronic device and the electronic device 10 is not within the predetermined distance, the electronic device 10 may not receive the location information from the external electronic device. For example, the electronic device 10 may not request the third external electronic device 130 to provide the location information since the distance to the third external electronic device 130 in the second sub-room is not within the predetermined distance (e.g., 3~4 m) in (a) of FIG. 1. As a result, the electronic device 10 may not display the second sub-room on the execution screen 340 of the IoT application.

According to various embodiments, if the audio sound is not received from the external electronic device, the electronic device 10 may not display information of a location in which the external electronic device is placed. For example, the electronic device 10 may not receive the audio sound from the third external electronic device 130 in the second sub-room in (a) of FIG. 1. As a result, the electronic device 10 may not display the second sub-room on the execution screen 340 of the IoT application.

According to an embodiment, the electronic device 10 may display a location adding object 324 which newly adds the location of the electronic device 10 on the execution screen 340 of the IoT application. When the user selects the location adding object 324, the electronic device 10 may newly add the location of the electronic device 10 instead of the location received from the external electronic device.

Referring to (c) of FIG. 3, the electronic device 10 may register the living room 321 as the location of the electronic device 10 in response to a user input for selecting the living room 321. According to an embodiment, the electronic device 10 may simultaneously display external electronic devices pre-registered on the execution screen 340 of the IoT application and a list 330 for locations of the external electronic devices.

Figure 4:
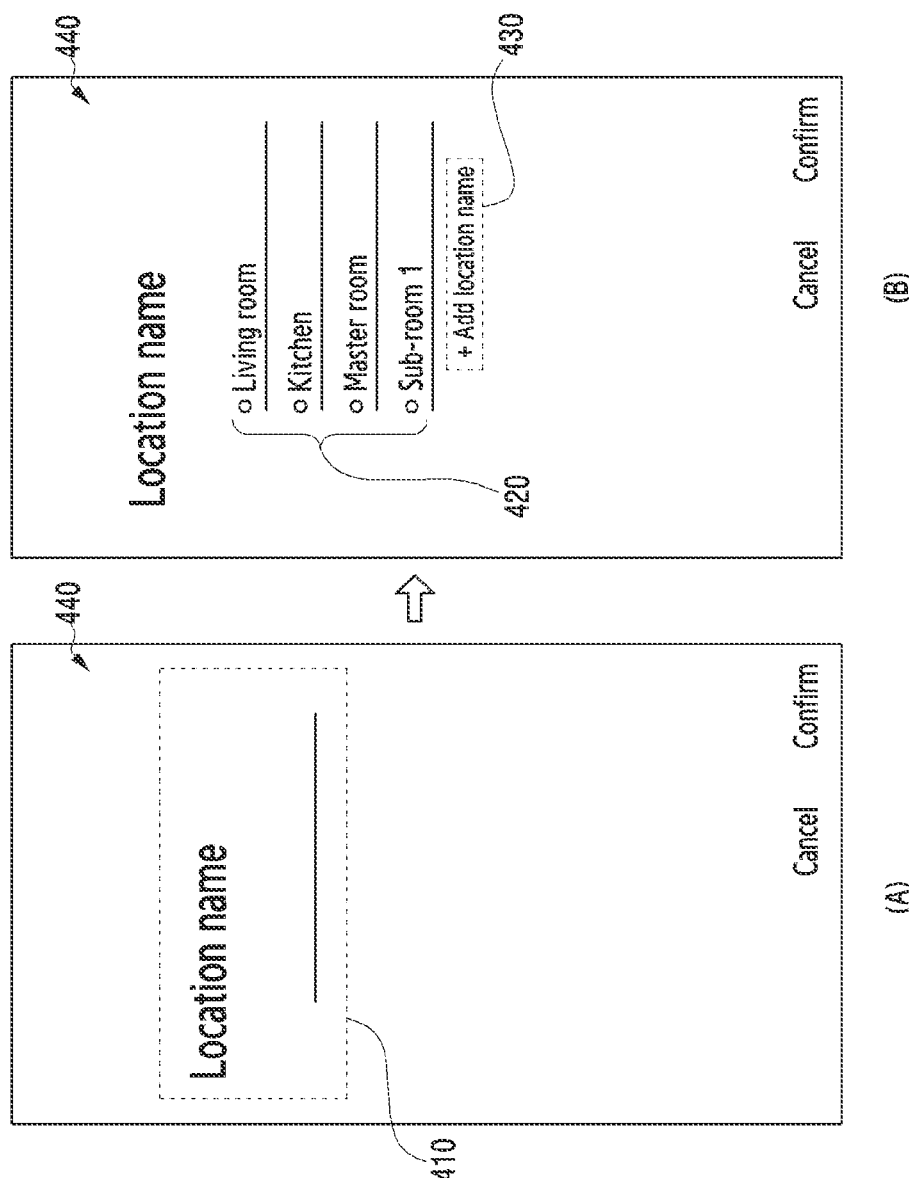
FIG. 4 illustrates a situation in which an electronic device manually adds a location of the electronic device according to an embodiment.

FIG. 4 illustrates a situation in which an electronic device manually adds a location of the electronic device according to an embodiment.

According to an embodiment, the electronic device 10 may display an execution screen 440 of an IoT application in which a user of the electronic device 10 directly registers a location. The electronic device 10 may display, for example, a user interface in which the user directly, registers the location on the execution screen 440 of the IoT application in response to the user input for selecting the location adding object 324 described above with reference to FIG. 3.

Referring to (a) of FIG. 4, the electronic device 10 may display a location input object 410 capable of inputting a name of a region in which the electronic device 10 is located.

Referring to (b) of FIG. 4, the electronic device 10 may display a pre-stored location list 420 on the execution screen 440 of the IoT application in response to the user input for selecting the location input object 410. For example, the electronic device 10 may display regions stored previously while registering another electronic device to a cloud server as the location list 420.

According to various embodiments, the electronic device 10 may display a location name adding object 430 on the IoT application execution screen 440 so that the user can directly add a name of regions in which the electronic device can be located. The user may select the location name adding object 430 to add the name of the regions in which the electronic device can be located.

Figure 5A:
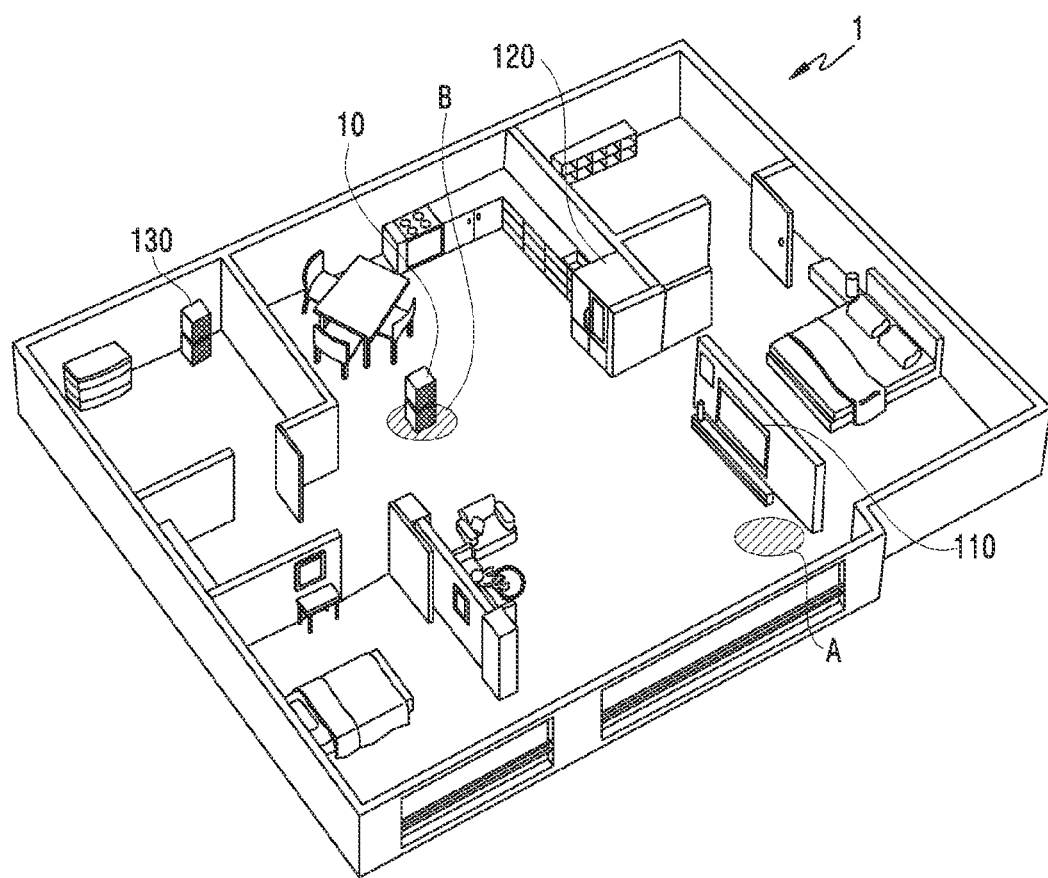
FIG. 5A and FIG. 5B illustrate a situation in which an electronic device registers a location and then moves the location according to an embodiment.
Figure 5B:
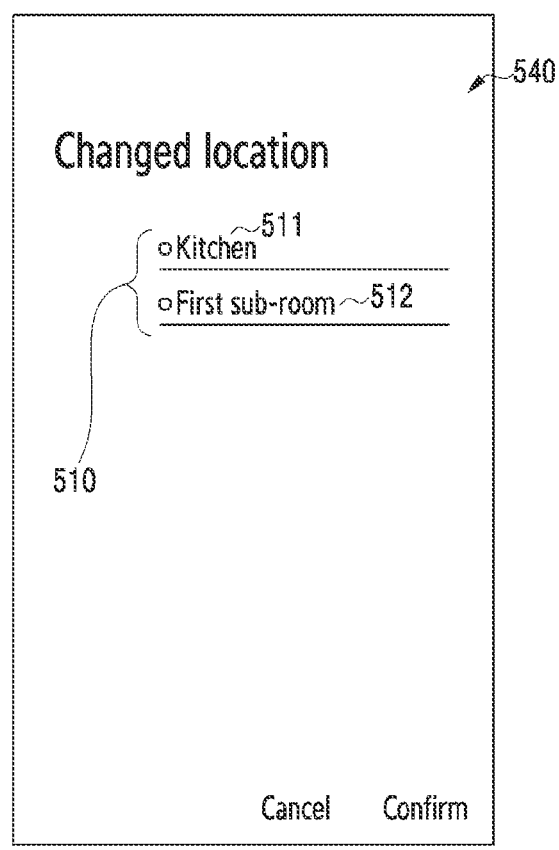

FIG. 5A and FIG. 5B illustrate a situation in which an electronic device registers a location and then moves the location according to an embodiment.

According to an embodiment, when power is turned off and then turned on again, the electronic device 10 may transmit an audio sound to identify whether there is a change in a surrounding situation. Alternatively, the electronic device 10 may transmit the audio sound every, set period to identify whether there is the change in the surrounding situation.

Referring to FIG. 5A, the electronic device 10 may move from a location A to a location B. When the power is turned off and then turned on again or a set period has been reached while the electronic device 10 moves as described above, an audio sound may be transmitted to identify whether there is the change in the surrounding situation.

For example, the electronic device 10 may transmit a first audio sound including information reporting a presence of the electronic device 10. The electronic device 10 may receive from the first external electronic device 110 a second audio sound including identification information of the first external electronic device 110 in response to the first audio sound.

After receiving the second audio sound, the electronic device 10 may transmit a third audio sound including time information to acquire a distance to the first external electronic device 110. The electronic device 10 may receive from the first external electronic device 110 a fourth audio sound including time information in response to the third audio sound including time information provided from the first external electronic device 110.

The electronic device 10 may use the transmitted time information and the received time information to acquire the distance to the first external electronic device 110. The electronic device 10 may identify that the distance to the first external electronic device 110 is not within a predetermined distance. Accordingly, the electronic device 10 may not transmit an audio sound inquiring location information of the first external electronic device 110.

According to an embodiment, the electronic device 10 may receive from the second external electronic device 120 a seventh audio sound including identification information of the second external electronic device 120 in response to the first audio sound.

After receiving the seventh audio sound, the electronic device 10 may transmit an eighth audio sound including time information to acquire a distance to the second external electronic device 120. The electronic device 10 may receive from the second external electronic device 120 a ninth audio sound including time information in response to the eighth audio sound including time information provided from the second external electronic device 120.

The electronic device 10 may use the transmitted time information and the received time information to acquire the distance to the second external electronic device 120. The electronic device 10 may identify that the distance to the second external electronic device 120 is within a predetermined distance.

The electronic device 10 may transmit to the second external electronic device 10 a tenth audio sound inquiring location information. The electronic device 10 may receive from the second external electronic device 120 an eleventh audio sound including an answer for the tenth audio sound inquiring the location information.

Referring to (b) of FIG. 5, the electronic device 10 may display a location received from the external electronic device on an execution screen 540 of the IoT application. According to an embodiment, the electronic device 10 may display location information 510 received from the external electronic device in proportion to a distance between the external electronic device and the electronic device 10. For example, the electronic device 10 may display a kitchen 511, which is location information received from the second external electronic device 120 closest in distance to the electronic device 10, on the top.

In addition, the electronic device 10 may perform the same operation, with respect to the third external electronic device 130, as that of acquiring location information of the second external electronic device 120 while transmitting/receiving an audio sound with respect to the electronic device 10 and the second external electronic device 120 in FIG. 5A. As a result, the electronic device 10 may display a first sub-room 512, which is location information received from the third external electronic device 10, subsequent to the kitchen 511.

As described above with reference to FIG. 5A, if the distance between the external electronic device and the electronic device 10 is not within the predetermined distance, the electronic device 10 may not receive location information from the external electronic device. For example, the electronic device 10 may identify that the distance to the first external electronic device 110 exceeds the predetermined distance, and may not receive the location information from the first external electronic device 110. Accordingly, the electronic device 10 may not display the execution screen 140 of the IoT application and the living room in which the first external electronic device 110 is located.

As such, according to an embodiment of the disclosure, the electronic device 10 may identify a changed surrounding situation by transmitting an audio sound to the vicinity periodically or depending on a set condition. Accordingly, even if the location of the electronic device 10 is changed, the user may easily register the changed location.

Figure 6:
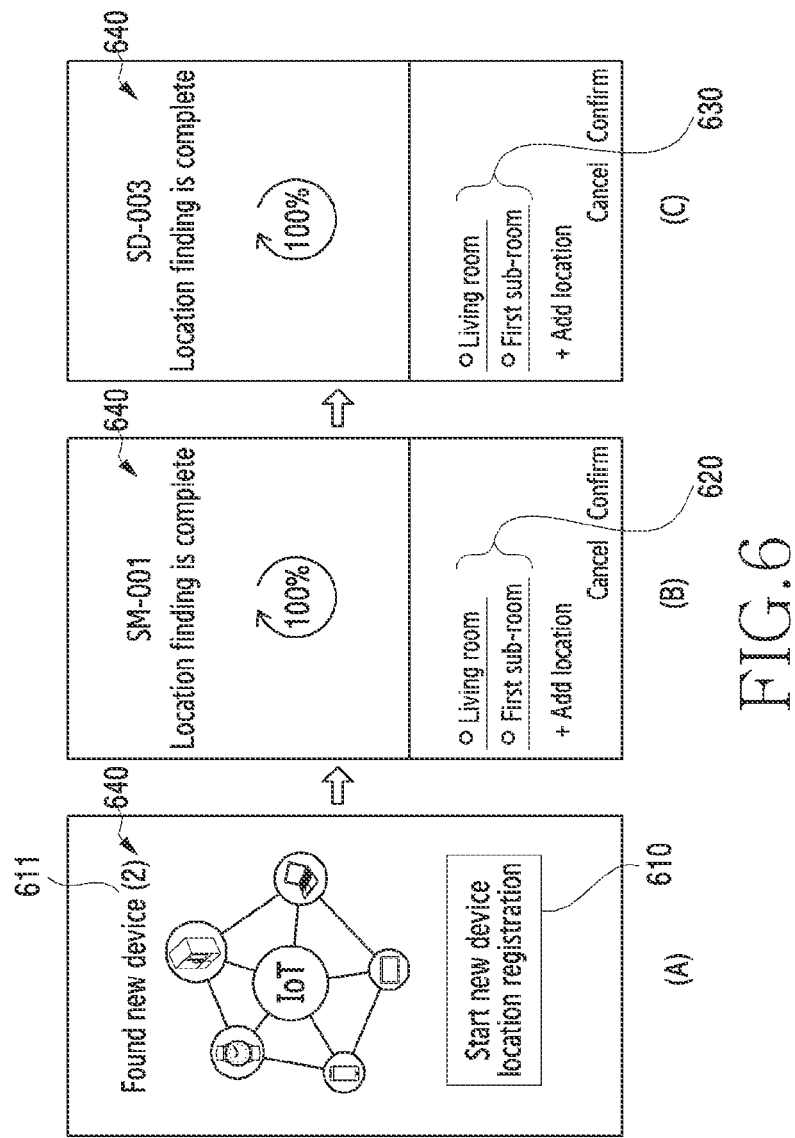
FIG. 6 illustrates a situation in which an electronic device registers a plurality of unregistered external electronic devices according to an embodiment.

FIG. 6 illustrates a situation in which an electronic device registers a plurality of unregistered external electronic devices according to an embodiment.

According to an embodiment, when power is turned off and then turned on again, the electronic device 10 may transmit an audio sound to identify whether there is a change in a surrounding situation. Alternatively, the electronic device 10 may transmit the audio sound every set period to identify whether there is the change in the surrounding situation.

Referring to (a) of FIG. 6, the electronic device 10 may use an execution screen 640 of an IoT application to inform a user that unregistered external electronic devices have been found in the vicinity of the electronic device 10. For example, the electronic device 10 may transmit an audio sound including information reporting a presence of the electronic device 10, and may receive from the external electronic device an audio sound including identification information of the external electronic device in response to the information reporting the presence of the electronic device 10, thereby finding the unregistered external electronic devices. According to an embodiment, the electronic device 10 may manage a list of at least one electronic device located in the vicinity or may receive the list from an external server. For example, upon receiving an audio sound from an external electronic device not included in the list, the electronic device 10 may determine that there is an unregistered external electronic device. According to various embodiments, the electronic device 10 may display the number of found external electronic devices as a numeral 611, while informing the user that new electronic devices have been found.

According to an embodiment, the electronic device 10 may display a new device location registration execution object 610 for registering the found external electronic device on the execution screen 640 of the IoT application. The electronic device 10 may perform a registration process for the found external electronic device in response to the user input for selecting the new device location registration execution object 610. That is, the user may use the electronic device 10 to perform the registration process for the external electronic device which has not yet been registered to a cloud.

For example, the electronic device 10 may transmit an audio sound including time information for acquiring a distance. The electronic device 10 may receive the audio sound including the time information from at least one external electronic device in response to the audio sound including time information for acquiring a distance to at least one external electronic device. The electronic device 10 may acquire a distance between the electronic device and the external electronic devices on the basis of the transmitted time information and the received time information.

Referring to (b) of FIG. 6 to (c) of FIG. 6, the electronic device 10 may sequentially perform the registration process for at least one found external electronic device.

Referring to (b) of FIG. 6, the electronic device 10 may use an execution screen 640 of an IoT application to register a location of the external electronic device (e.g., identification information SM-001). For example, the electronic device 10 may display a location list 620, in which the SM-001 can be registered, on the execution screen 640 of the IoT application. The location list 620 may be provided, for example, by using location information pre-stored in the electronic device 10. As another example, the electronic device 10 may receive information of a location at which the electronic device 10 is currently placed from a pre-registered external electronic device (e.g., the first external electronic device 110 or the second external electronic device 120), and may provide the location list 620 on the basis of the received information. The electronic device 10 may register the location of the external electronic device (e.g, identification information SM-001) in response to a user input for selecting at least one location.

Referring to (c) of FIG. 6, the electronic device 10 may use the execution screen 640 of the IoT application to register the location of the external electronic device (e.g., identification information SD-003). For example, the electronic device 10 may display a location list 630, in which the SD-003 can be registered, on the execution screen 640 of the IoT application. The location list 630 may be provided, for example, by using location information pre-stored in the electronic device 10 or information received from the pre-registered external electronic device. The electronic device 10 may register the location of the external electronic device (e.g., identification information SD-003) in response to a user input for selecting at least one location.

As such, according to an embodiment of the disclosure, the electronic device 10 may easily register the plurality of unregistered external electronic devices.

Figure 7:
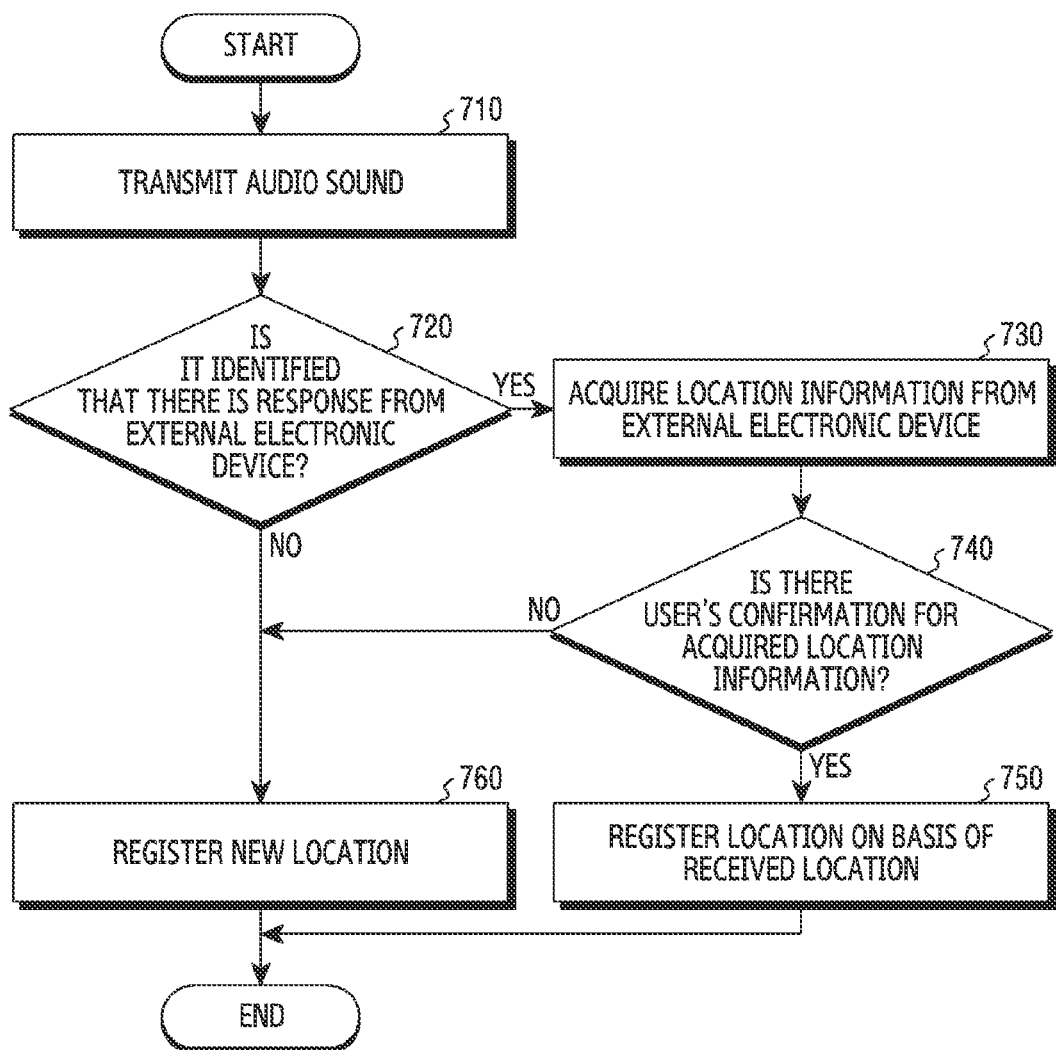
FIG. 7 is a flowchart briefly illustrating a location registering process of an electronic device according to an embodiment.

FIG. 7 is a flowchart briefly illustrating a location registering process of an electronic device according to an embodiment.

In operation 710, the electronic device 10 may transmit an audio sound through the speaker 230. For example, if location information of the electronic device 10 has not been registered, the electronic device 10 may transmit an audio sound for location registration through the speaker 230

In operation 720, the electronic device 10 may identify whether there is a response from an external electronic device.

For example, the electronic device 10 may transmit an audio sound including information reporting a presence of the electronic device 10, and may receive an audio sound including identifier information of the external electronic device through the microphone 220 in response to information reporting the presence of the electronic device 10 from the external electronic device (e.g., the first external electronic device 110 or the second external electronic device 102).

In operation 730, in the presence of the response from the external electronic device, the electronic device 10 may acquire location information from the external electronic device.

For example, the electronic device 10 may transmit an audio sound including time information for acquiring a distance. The electronic device 10 may receive the audio sound including the time information from the external electronic devices in response to the audio sound including the time information for acquiring the distance. The electronic device 10 may acquire a distance between the electronic device and the external electronic devices on the basis of the transmitted time information and the received time information.

If the acquired distance is within a predetermined distance, the electronic device 10 may transmit an audio sound inquiring location information. The electronic device 10 may receive from the external electronic devices the audio sound including the location information in response to the inquiry of the location information.

In operation 740, the electronic device 10 may identify a user's confirmation with respect to the acquired location information.

For example, the electronic device 10 may provide the user with at least one piece of location information acquired based on the audio sound received from the external electronic devices.

In operation 750, upon identifying the user's confirmation, the electronic device 10 may register a location of the electronic device 10 on the basis of the received location information.

For example, the electronic device 10 may register the location of the electronic device 10 in response to a user input for selecting any one of at least one or more received locations.

In operation 760, if there is no response from the external electronic device, the electronic device 10 may provide a user interface through which the user can directly input a new location to register the location.

Figure 8:
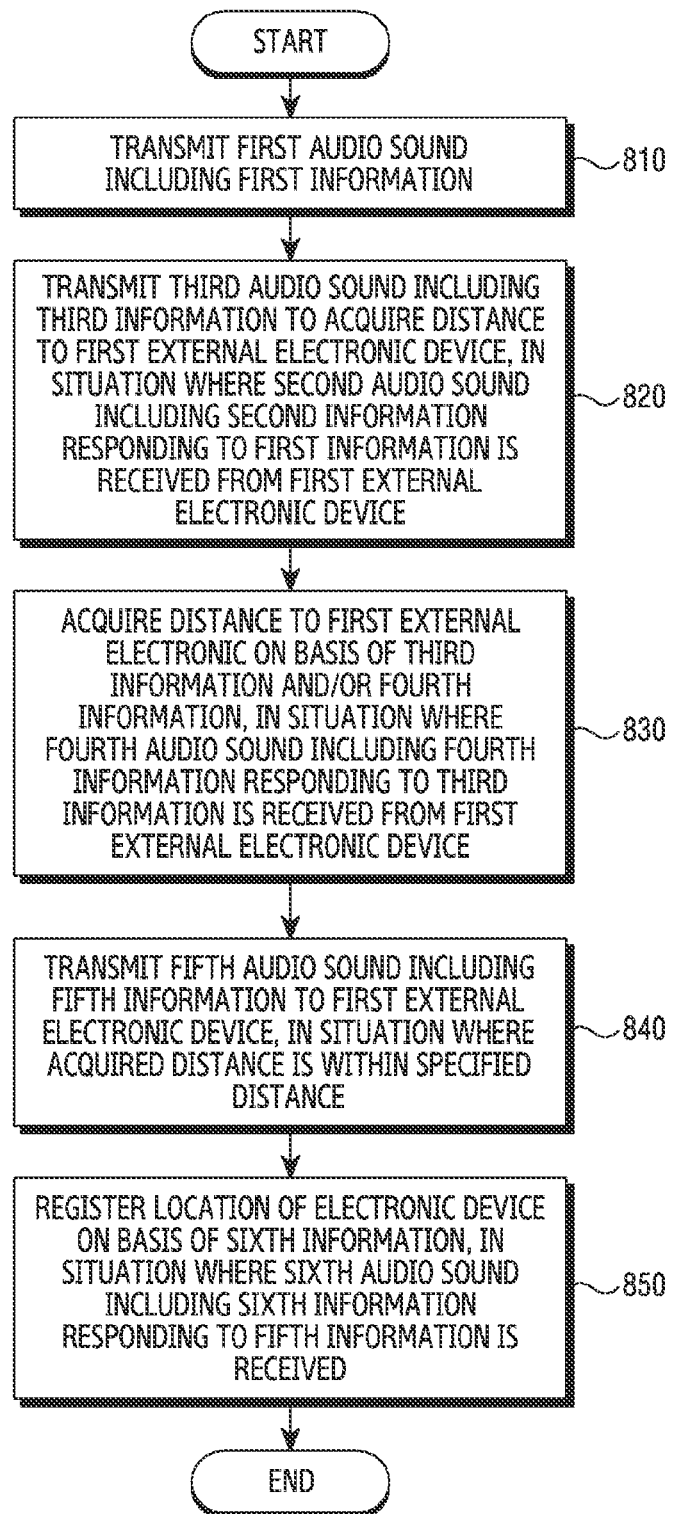
FIG. 8 is a flowchart illustrating a location registering process of an electronic device according to various embodiments.

FIG. 8 is a flowchart illustrating a location registering process of an electronic device according to various embodiments.

In operation 810, the electronic device 10 may transmit a first audio sound including first information. The first information may include, for example, a message (e.g., Hello) reporting a presence of the electronic device 10.

In operation 820, the electronic device 10 may receive from the first external electronic device 110 a second audio sound including second information responding to the first information, and may transmit a third audio sound including third formation to acquire a distance to the first external electronic device 110.

The second information may include, for example, a unique identification number (or an IDentification (ID)) of the first external electronic device 110.

In operation 830, the electronic device 10 may receive from the first external electronic device 110 a fourth audio sound including fourth information responding to the third information, and may acquire the distance to the first external electronic device 110 on the basis of the third information and/or the fourth information. The third information and the fourth information may include, for example, time information.

In operation 840, if the acquired distance is a predetermined distance, the electronic device 10 may transmit to the first external electronic device 110 a fifth audio sound including fifth information. The fifth information may include, for example, content inquiring location information of the first external electronic device 110.

In operation 850, the electronic device 10 may receive a sixth audio sound including sixth information responding to the fifth information, and may register a location of the electronic device 10 on the basis of the sixth information. The sixth information may include, for example, content for location information of the first external electronic device 110.

Figure 9:
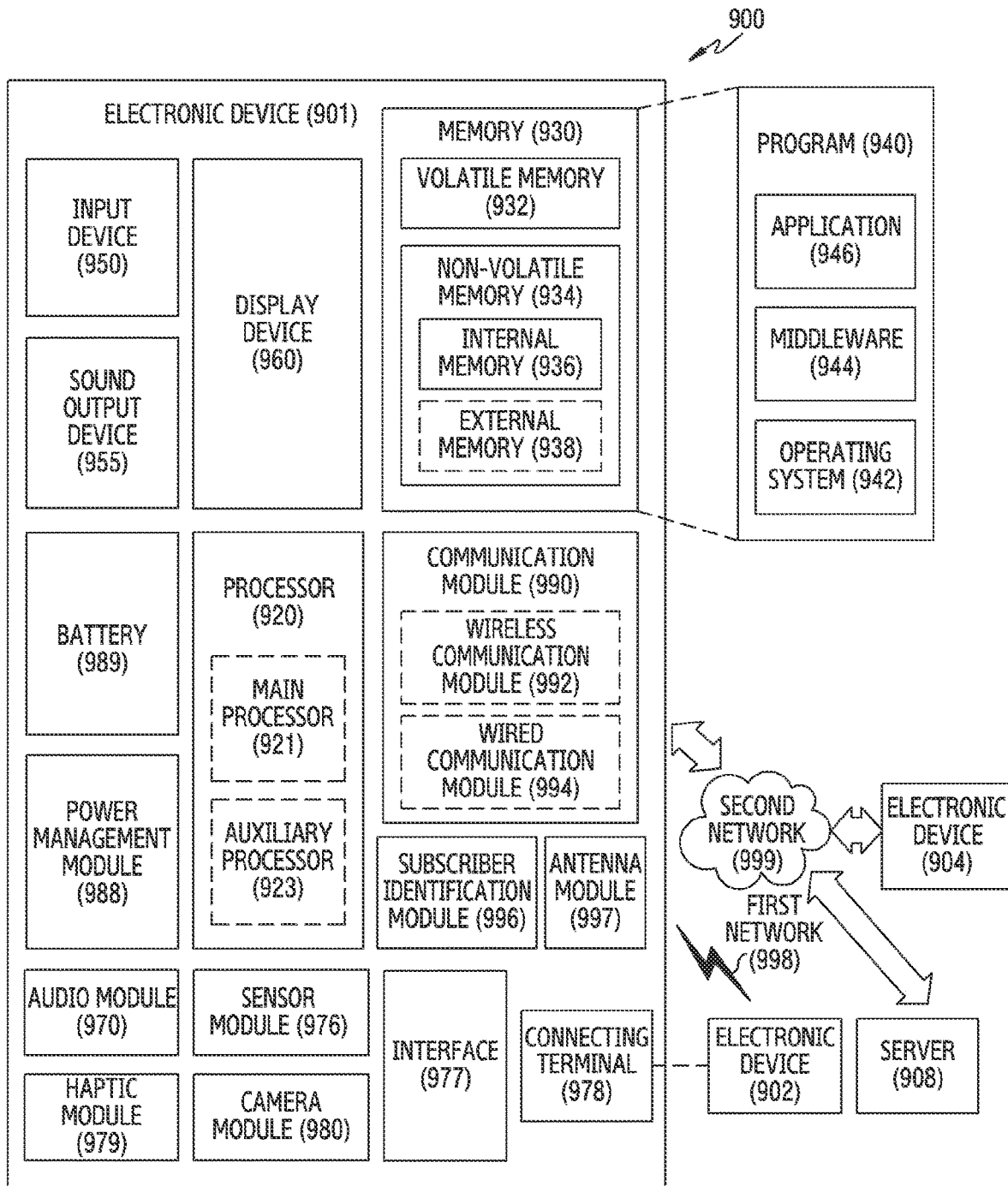
FIG. 9 is a block diagram of an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GLASS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, an electronic device (e.g., the electronic device 10) may include a display (e.g., the display 250), a communication module (e.g., the communication module 260), at least one microphone (e.g., the microphone 220), at least one speaker e.g., the speaker 230), a processor (e.g., the processor 21) operatively coupled to the display, the communication module, the microphone, and the speaker, and a memory (e.g., the memory 240) operatively coupled to the processor. According to an embodiment, the memory may store instructions, when executed, causing the processor to transmit, through the speaker, a first audio sound including first information, receive, through the microphone, a second audio sound including second information responding to the first information from a first external electronic device, transmit, through the speaker, a third audio sound including third information for acquiring a distance to the first external electronic device after receiving the second audio sound, receive, through the microphone, a fourth audio sound including fourth information responding to the third information from the first external electronic device, acquire the distance to the first external electronic device on the basis of the third information and/or the fourth information, transmit, through the speaker, a fifth audio sound including fifth information to the first external electronic device, if the acquired distance is within a predetermined distance, receive, through the microphone, a sixth audio sound including sixth information responding to the fifth information, and register a location of the electronic device on the basis of the sixth information.

According to various embodiments, the third information and the fourth information may include time information, and the instructions may cause the processor to identify a distance between the electronic device and the first external electronic device on the basis of the time information.

According to various embodiments, the instructions may cause the processor to receive a seventh audio sound including seventh information responding to the first information from a second external electronic device through the microphone transmit an eighth audio sound including eighth information for identifying a distance to the second external electronic device through the speaker, after receiving the seventh audio sound, receive a ninth audio sound including ninth information responding to the eighth information from the second external electronic device through the microphone, identify the distance to the second external electronic device on the basis of the eighth information and/or the ninth information, transmit a tenth audio sound including tenth information to the second external electronic device through the speaker if the identified distance is a predetermined distance, and receive an eleventh audio sound including eleventh information responding to the tenth information through the microphone.

According to various embodiments, the instructions may cause the processor to register a location of the electronic device, based at least in part of the tenth information and/or the eleventh information.

According to various embodiments, the instructions may cause the processor to provide a user interface for registering a location of the electronic device through the display.

According to various embodiments, the instructions may cause the processor to identify whether location information of the electronic device is stored in the memory, and transmit the first audio sound on the basis of the identification result.

According to various embodiments, the predetermined distance may be determined based on strength of the first audio sound.

According to various embodiments, the instructions may cause the processor to transmit the first audio sound in at least one of a situation where power of the electronic device is turned off and then turned on again and a situation where a set period has been reached.

According to various embodiments, the instructions may cause the processor to, after registering the location of the electronic device, when it is identified that an external electronic device of which a location is not registered is within a predetermined distance, register the location of the electronic device as the location of the external electronic device.

According to various embodiments, the instructions may cause the processor to transmit information related to a location of the electronic device to an external electronic device including a display, so that the external electronic device provides a user interface for registering the location of the electronic device.

According to various embodiments, a method of controlling an electronic device may include transmitting a first audio sound including first information through a speaker, receiving a second audio sound including second information responding to the first information from a first external electronic device through a microphone, and transmitting a third audio sound including third information for identifying a distance to the first external electronic device through the speaker, receiving a fourth audio sound including fourth information responding to the third information from the first external electronic device through the microphone, and acquire the distance to the first external electronic device on the basis of the third information and/or the fourth information, transmitting a fifth audio sound including fifth information to the first external electronic device through the speaker, if the acquired distance is within a predetermined distance, and receiving a sixth audio sound including sixth information responding to the fifth information through the microphone and registering a location of the electronic device on the basis of the sixth information.

According to various embodiments, the third information and the fourth information may include time information. The method may further include identifying a distance between the electronic device and the first external electronic device on the basis of the time information.

According to various embodiments, the method may further include receiving a seventh audio sound including seventh information responding to the first information from a second external electronic device through the microphone, and transmitting an eighth audio sound including eighth information for identifying a distance to the second external electronic device through the speaker, receiving a ninth audio sound including ninth information responding to the eighth information from the second external electronic device through the microphone, and acquiring the distance to the second external electronic device on the basis of the eighth information and/or the ninth information, transmitting a tenth audio sound including tenth information to the second external electronic device through the speaker if the acquired distance is a predetermined distance, and receiving an eleventh audio sound including eleventh information responding to the tenth information through the microphone.

According to various embodiments, the method may include registering a location of the electronic device, based at least in part of the tenth information and/or the eleventh information.

According to various embodiments, the method may include providing a user interface for registering a location of the electronic device through the display of the electronic device.

According to various embodiments, the method may include identifying whether location information of the electronic device is stored, and transmitting the first audio sound on the basis of the identification result.

According to various embodiments, the predetermined distance may be determined based on strength of the first audio sound.

According to various embodiments, the method may include transmitting the first audio sound in at least one of a situation where power of the electronic device is turned off and then turned on again and a situation where a set period has been reached.

According to various embodiments, the method may include, after registering the location of the electronic device, when it is identified that an external electronic device of which a location is not registered is within a predetermined distance, registering the location of the electronic device as the location of the external electronic device.

According to various embodiments, a computer readable storage medium may store instructions for transmitting a first audio sound including first information through a speaker, receiving a second audio sound including second information responding to the first information from a first external electronic device through a microphone, and transmitting a third audio sound including third information for identifying a distance to the first external electronic device through the speaker, receiving a fourth audio sound including fourth information responding to the third information from the first external electronic device through the microphone, and acquire the distance to the first external electronic device on the basis of the third information and/or the fourth information, transmitting a fifth audio sound including fifth information to the first external electronic device through the speaker, if the acquired distance is within a predetermined distance, and receiving a sixth audio sound including sixth information responding to the fifth information through the microphone, and registering a location of the electronic device on the basis of the sixth information.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display;
a communication module;
at least one microphone;
at least one speaker;
a processor operatively coupled to the display, the communication module, the microphone, and the speaker; and
a memory operatively coupled to the processor,
wherein the memory stores instructions, when executed, causing the processor to:
transmit, through the speaker, a first audio sound including first information;
receive, through the microphone, a second audio sound including second information responding to the first information from a first external electronic device;
transmit, through the speaker, a third audio sound including third information for acquiring a distance to the first external electronic device, after receiving the second audio sound;
receive, through the microphone, a fourth audio sound including fourth information responding to the third information from the first external electronic device;
acquire the distance to the first external electronic device on the basis of the third information and/or the fourth information;
transmit, through the speaker, a fifth audio sound including fifth information to the first external electronic device, if the acquired distance is within a first predetermined distance;
receive, through the microphone, a sixth audio sound including sixth information responding to the fifth information;
register a location of the electronic device on the basis of the sixth information; and
after registering the location of the electronic device, when it is identified that an external electronic device of which a location is not registered is within a second predetermined distance, register the location of the electronic device as the location of the external electronic device.

2. The electronic device of claim 1,
wherein the third information and the fourth information include time information, and
wherein the instructions cause the processor to identify a distance between the electronic device and the first external electronic device on the basis of the time information.

3. The electronic device of claim 2, wherein the instructions cause the processor to:
receive a seventh audio sound including seventh information responding to the first information from a second external electronic device through the microphone;
transmit an eighth audio sound including eighth information for identifying a distance to the second external electronic device through the speaker, after receiving the seventh audio sound;
receive a ninth audio sound including ninth information responding to the eighth information from the second external electronic device through the microphone;
identify the distance to the second external electronic device on the basis of the eighth information and/or the ninth information;
transmit a tenth audio sound including tenth information to the second external electronic device through the speaker, if the identified distance is a third predetermined distance; and
receive an eleventh audio sound including eleventh information responding to the tenth information through the microphone.

4. The electronic device of claim 3, wherein the instructions cause the processor to register a location of the electronic device, based at least in part of the tenth information and/or the eleventh information.

5. The electronic device of claim 1, wherein the instructions cause the processor to provide a user interface for registering a location of the electronic device through the display.

6. The electronic device of claim 1, wherein the instructions cause the processor to identify whether location information of the electronic device is stored in the memory, and transmit the first audio sound on the basis of the identification result.

7. The electronic device of claim 1, wherein the instructions cause the processor to transmit information related to a location of the electronic device to an external electronic device including a display, so that the external electronic device provides a user interface for registering the location of the electronic device.

8. A method of controlling an electronic device, the method comprising:
- transmitting a first audio sound including first information through a speaker;
- receiving a second audio sound including second information responding to the first information from a first external electronic device through a microphone, and transmitting a third audio sound including third information for identifying a distance to the first external electronic device through the speaker;
- receiving a fourth audio sound including fourth information responding to the third information from the first external electronic device through the microphone, and acquire the distance to the first external electronic device on the basis of the third information and/or the fourth information;
- transmitting a fifth audio sound including fifth information to the first external electronic device through the speaker, if the acquired distance is within a first predetermined distance;
- receiving a sixth audio sound including sixth information responding to the fifth information through the microphone, and registering a location of the electronic device on the basis of the sixth information; and
- after registering the location of the electronic device, when it is identified that an external electronic device of which a location is not registered is within a second predetermined distance, registering the location of the electronic device as the location of the external electronic device.

9. The method of claim 8,
wherein the third information and the fourth information include time information, and
wherein the method further comprises identifying a distance between the electronic device and the first external electronic device on the basis of the time information.

10. The method of claim 8, further comprising:
- receiving a seventh audio sound including seventh information responding to the first information from a second external electronic device through the microphone, and transmitting an eighth audio sound including eighth information for identifying a distance to the second external electronic device through the speaker;
- receiving a ninth audio sound including ninth information responding to the eighth information from the second external electronic device through the microphone, and acquiring the distance to the second external electronic device on the basis of the eighth information and/or the ninth information;
- transmitting a tenth audio sound including tenth information to the second external electronic device through the speaker, if the acquired distance is a third predetermined distance; and
- receiving an eleventh audio sound including eleventh information responding to the tenth information through the microphone.

11. The method of claim 10, further comprising registering a location of the electronic device, based at least in part of the tenth information and/or the eleventh information.

12. The method of claim 8, further comprising providing a user interface for registering a location of the electronic device through the display of the electronic device.

13. The method of claim 8, further comprising identifying whether location information of the electronic device is stored, and transmitting the first audio sound on the basis of the identification result.

14. The electronic device of claim 1, wherein the first predetermined distance is determined based on strength of the first audio sound.

15. The electronic device of claim 1, wherein the instructions cause the processor to transmit the first audio sound in a situation where power of the electronic device is turned off and then turned on again.

16. The method of claim 8, wherein the first predetermined distance is determined based on strength of the first audio sound.

17. The method of claim 8, further comprising transmitting the first audio sound in a situation where power of the electronic device is turned off and then turned on again.

18. A non-transitory computer readable storage medium storing instructions that, when executed, cause at least one processor to control an electronic device, wherein the instructions cause the at least one processor to:
- transmit a first audio sound including first information through a speaker;
- receive a second audio sound including second information responding to the first information from a first external electronic device through a microphone, and transmitting a third audio sound including third information for identifying a distance to the first external electronic device through the speaker;
- receive a fourth audio sound including fourth information responding to the third information from the first external electronic device through the microphone, and acquire the distance to the first external electronic device on the basis of the third information and/or the fourth information;
- transmit a fifth audio sound including fifth information to the first external electronic device through the speaker, if the acquired distance is within a first predetermined distance;
- receive a sixth audio sound including sixth information responding to the fifth information through the microphone, and registering a location of the electronic device on the basis of the sixth information; and
- after registering the location of the electronic device, when it is identified that an external electronic device of which a location is not registered is within a second predetermined distance, registering the location of the electronic device as the location of the external electronic device.

* * * * *